United States Patent [19]
Fiechtner

[11] Patent Number: 5,050,634
[45] Date of Patent: Sep. 24, 1991

[54] VERY LOW DIFFERENTIAL PRESSURE SWITCH

[75] Inventor: Bradley T. Fiechtner, San Diego, Calif.

[73] Assignee: Hasstech, Inc., San Diego, Calif.

[21] Appl. No.: 635,285

[22] Filed: Dec. 28, 1990

[51] Int. Cl.$^5$ .............................................. G05D 7/06
[52] U.S. Cl. .................................. 137/486; 137/487.5; 200/83 A
[58] Field of Search ............. 200/81.9 R, 83 R, 83 A, 200/83 Q, 83 S; 137/486, 487.5

[56] References Cited

U.S. PATENT DOCUMENTS

| | | | |
|---|---|---|---|
| 2,477,801 | 8/1949 | Hathaway | 200/83 N |
| 2,967,944 | 1/1961 | Lusted | 200/83 N X |
| 3,005,887 | 10/1961 | Robson | 200/83 A X |
| 3,911,393 | 10/1975 | Biggs | 200/83 N X |
| 4,436,110 | 3/1984 | Leeuwma | 137/487.5 |
| 4,721,128 | 1/1988 | Padilla | 137/487.5 X |
| 4,796,651 | 1/1989 | Ginn | 137/487.5 X |

FOREIGN PATENT DOCUMENTS 1089516  11/1967  United Kingdom ............ 200/83 N

OTHER PUBLICATIONS

Turck, "Proximity Sensor Manual," cover and pp. A8-A11, B83, B84, B87, B88 (Oct. 1988).
Microswitch, "900 Series Nickel-Plated Proximity Sensors," cover and pp. 2-8.
Neo-Dyn ITT, "Industrial Catalog," cover and pp. 4, 5, 28, 29, 50, 51 and three other pages.
Dwyer, "Controls and Gages", cover and pp. 3, 4, 8-10, 12 and back cover (Jan. 1989).
United Electric Controls Co., "UE Electromechanical Products," cover, inside page and pp. 28-33.

*Primary Examiner*—Alan Cohan
*Attorney, Agent, or Firm*—Baker, Maxham, Jester & Meador

[57] ABSTRACT

A very low differential pressure switch for detecting pressure differential across two points of a pressurized system. A flexible diaphragm divides two cavities which are exposed to fluid pressures across two points of the pressurized system, and moves a sensor actuating target axially against a compression spring relative to the sensed differential pressures. The switch has a proximity sensor responsive to the axial location of the target to produce an output indicative of a pressure differential condition between the two cavities. The switch has a selected pressure sensitivity and volumetric displacement threshold dependent in part on the cross-sectional area of the flexible diaphragm, size of the compression spring and on the distance between the diaphragm and the proximity sensor.

26 Claims, 4 Drawing Sheets

VERY LOW DIFFERENTIAL PRESSURE SWITCH

FIELD OF THE INVENTION

The present invention relates to switching apparatus for fluid lines, and more particularly to differential pressure sensing apparatus operable at very low differential pressures and under low flow conditions.

BACKGROUND OF THE INVENTION

In fluid line systems for the transfer of fluids, including pipelines, control lines and the like, control apparatus may be employed to maintain and control system function and operation. An area of particular interest in petroleum transfer systems is apparatus for leak detection, as may be used for example, in underground gasoline lines at service stations, wherein leakage cannot be visually determined. Such apparatus may include differential pressure switching to detect a differential pressure condition between two points in the system. Should a fluid leak develop in the system on one side of the switch, a differential pressure relative to the other side of the switch will result. When a preset differential pressure is reached, the switch is activated, and a visual indicator or other signal is generated. When the differential pressure has subsided to a preselected level, the switch is deactivated.

An example of a typical prior art differential pressure switch is shown in FIG. 1. The switch includes first inlet $I_1$ extending into first cavity $C_1$, second inlet $I_2$ extending into second cavity $C_2$, diaphragm D separating cavities $C_1$ and $C_2$, and trigger T attached to diaphragm D which contacts plunger P of microswitch S. The microswitch is activated by displacement of the diaphragm. Displacement occurs when the pressure in pressure cavity $C_1$ on one side of the diaphragm is greater than the pressure in pressure cavity $C_2$ on the opposite side of the diaphragm. When the diaphragm moves the plunger to a preset limit, the microswitch is activated.

Microswitch S has a relatively large physical force vs. displacement hysteresis during activation and deactivation of the electro-mechanical switch components. FIG. 2 illustrates this effect by showing the difference in the diaphragm force-displacement curves representing the switch activation and deactivation modes. The hysteresis occurs due to the natural operational characteristics of the microswitch, which incorporates a set of mechanical contacts that must be moved against an internal spring to achieve positive On-Off motion using a "snap action." This basic characteristic poses a problem when trying to measure extremely small differential pressures, such as those in the range of 1–5 inches of water column (that is, about 0.04–0.19 psi) with a small volumetric displacement. Although pressure sensitivity can be improved somewhat by increasing the size of the switch diaphragm so as to increase the force of the fluid thereon, enlarged diaphragms require a concomitant increase in volume differential for activation and still exhibit the same unacceptably high hysteresis. Such switches are therefore unsuitable for low pressure, low flow systems. Moreover, such switches may be unduly susceptible to caustic materials, such as petroleum, and the electrical sensing elements thereof may present an explosion hazard.

An alternative configuration of the standard differential pressure switch incorporates a snap action Belville spring. This, however, increases the hysteresis of the force vs. displacement of the diaphragm.

SUMMARY OF THE INVENTION

It is a primary object and advantage of the present invention to provide a low differential pressure switch responsive to low differential pressures and volumetric displacements.

It is a still further object and advantage of the present invention to provide a low differential pressure switch responsive to low differential pressures and volumetric displacements and having low force vs. displacement hysteresis characteristics.

In accordance with the foregoing objects and advantages there is provided in one aspect of the present invention a very low differential pressure switch that includes a first cavity for receiving a fluid from a first fluid source, a second cavity for receiving a fluid from a second fluid source, a flexible diaphragm dividing the first and second cavities, a sensor target located against the diaphragm within the second cavity, a proximity sensor having a sensor head spaced from the sensor target, the sensor being responsive to the relative position of the sensor target and the sensor head to produce an output indicative of a pressure differential condition between the first and second cavities. The switch has a selectable pressure sensitivity and volumetric displacement threshold dependent in part on the cross-sectional area of the flexible diaphragm, size of the compression spring and on the distance between the diaphragm and the proximity sensor, which distance is readily varied.

BRIEF DESCRIPTION OF THE DRAWING

The objects, advantages and features of the invention will be more readily apparent from the following detailed description when read in conjunction with the accompanying drawing, in which.

DETAILED DESCRIPTION OF PREFERRED EMBODIMENTS

Figure 4:
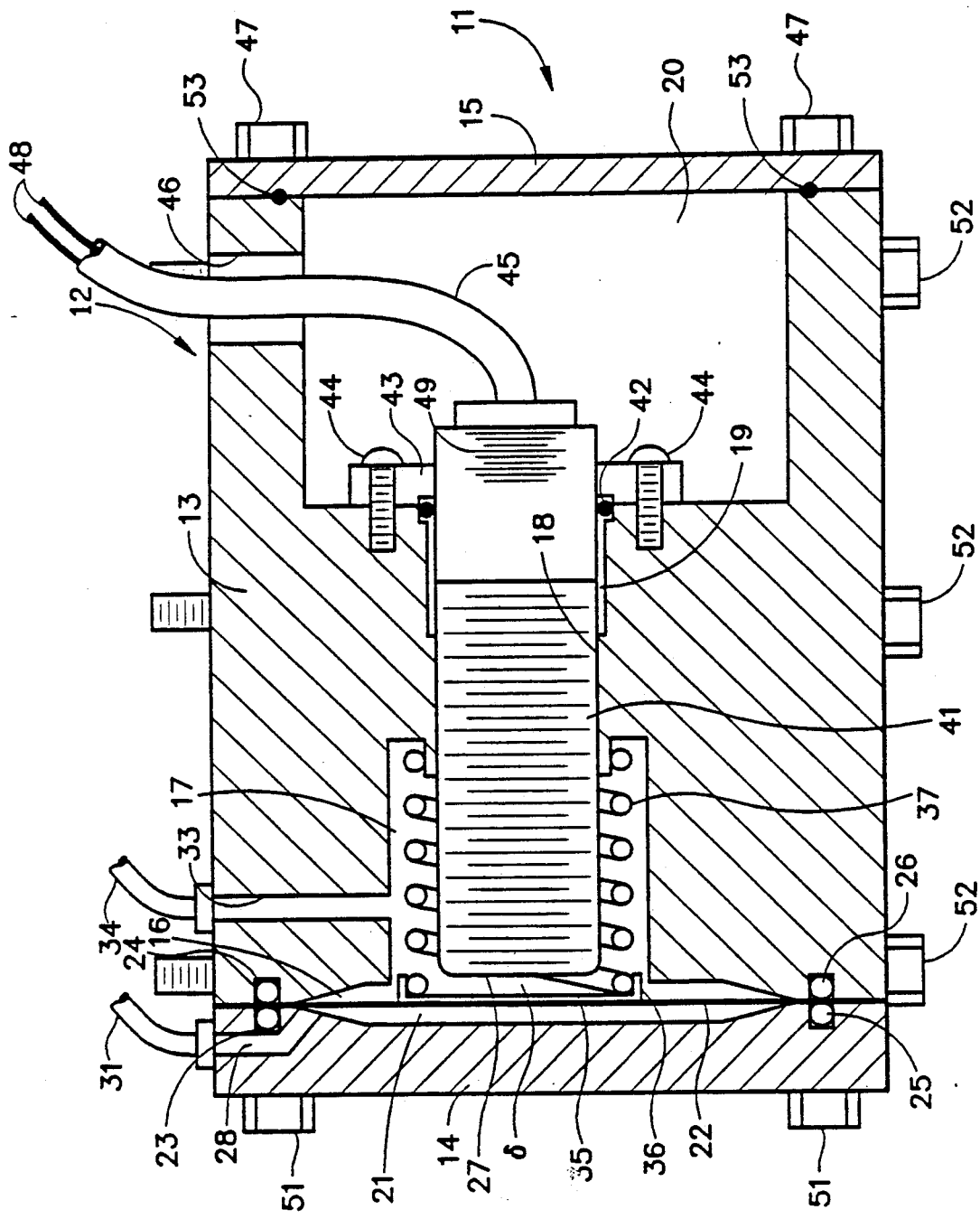
FIG. 4 is a cross-sectional side view of a differential pressure switch constructed in accordance with the present invention.

With reference now to FIG. 4 of the drawing, differential pressure switch 11 includes housing 12 having main body 13 and a pair of end caps 14 and 15. Main body 13 includes a plurality of chambers 16, 17, 18, 19 and 20. Chambers 16–20 are concentrically disposed about a common longitudinal axis of housing body 13 and are cylindrical or frustoconical in nature, but of different sizes. Exterior frustoconical chamber 16 commences at one end of housing body 13 adjacent end cap 14. Exterior chamber 16 transitions to internal cylindrical chamber 17 of reduced diameter. Interior chamber 17 transitions to a pair of smaller interior cylindrical chambers 18 and 19, chamber 18 having a threaded interior surface and chamber 19 having a diameter slightly greater than the diameter of chamber 18. Chamber 19 extends to exterior cylindrical chamber 20 of larger diameter than cylinder 19 that itself extends to the opposite end of housing body 13, adjacent end cap 15.

End cap 14 includes shallow frustoconical chamber 21 which is formed as a mirror image of exterior chamber 16 in housing body 13. Disposed between housing body 13 and end cap 14 is a flexible diaphragm 22. The diaphragm is preferably formed from a synthetic rubber-like material or other suitable flexible material capable of bidirectional translational motion along the central axis of housing body 13. There is further disposed on either side of flexible diaphragm 22, in the opposing faces of housing body 13 and end cap 14, a pair of opposing annular channels 23 and 24 containing respective resilient annular rings 25 and 26. Rings 25 and 26 provide a seal between chambers 16 and 21 and the exterior of housing body 13 and end cap 14.

Resilient diaphragm 22 defines in combination with chamber 21 of end cap 14, a first fluid cavity. Extending from the first fluid cavity (chamber 21) through end cap 14 to an exterior portion thereof is first fluid inlet 28. There is mounted to fluid inlet 28 first fluid inlet line 31 which, in turn, may extend to a first reference point in a fluid or pressure system, to be discussed in context later.

Flexible diaphragm 22 defines in combination with exterior chamber 16 and interior chamber 17 of housing body 10, a second fluid cavity. Extending from the second fluid cavity is second fluid inlet 33 which communicates to second fluid inlet line 34. Inlet line 34 extends to a second reference point in a fluid or pressure inlet system, also to be discussed in context later. There is located on one side of flexible diaphragm 22, and disposed within the second fluid chamber, aluminum sensor target 35. The target 35 is cup-shaped, having a disk-shaped body and includes annular flange 36 around the periphery thereof and extending away from flexible diaphragm 22. Extending between sensor target 35 and the opposite end of interior cavity 17 is compression spring 37. The target is forced against the diaphragm by the compressor spring and may also be force fit over the end of the spring. If desired, the target may be secured to the surface of the diaphragm.

There is also disposed within the second fluid cavity, and threadably engaged in interior cavity 18 of housing body 13, proximity sensor 41. Proximity sensor 41 is concentrically positioned within helical spring 37 and extends toward flexible diaphragm 22. Helical spring 37 provides a biasing force to the target and the flexible diaphragm away from end 27 of proximity sensor 41. Proximity sensor 41 is threadably adjusted in interior chamber 18 of the housing body 35 to provide a selected gap $\delta$ between the end of proximity sensor 41 and the surface of sensor target 35.

There is further provided in the interior chamber 19 of housing body 13 a shoulder, the end of which is adjacent exterior chamber 20. Disposed against the shoulder is annular sealing ring 42 which provides a pressure seal for the second fluid cavity. Pressure seal 42 is maintained in position around proximity sensor 41 and against the shoulder of interior chamber 19 by flanged retaining washer 43. Retaining washer 43 is mounted to housing body 13 by conventional fasteners 44, such as bolts or rivets.

Electrical cable 45, having wires 48, extends from the rear portion of proximity sensor 41 and through aperture 46 in housing body 13 to an external control circuit (described below). An appropriate seal for aperture 46 may be provided if desired, in compliance with explosion proof requirements. End cap 15 is mounted to the adjacent free end of housing body 13 by conventional fasteners 47. Similarly, end cap 14 is mounted to the opposite end of housing body 13 by conventional fasteners 51. Laterally extending fitting 52 secure switch 11 in its environment in the lateral direction. These are shown as bolts which pass completely through the switch. Annular ring seal 53 is positioned at the interface of end cap 15 and housing body 13.

Figure 5:
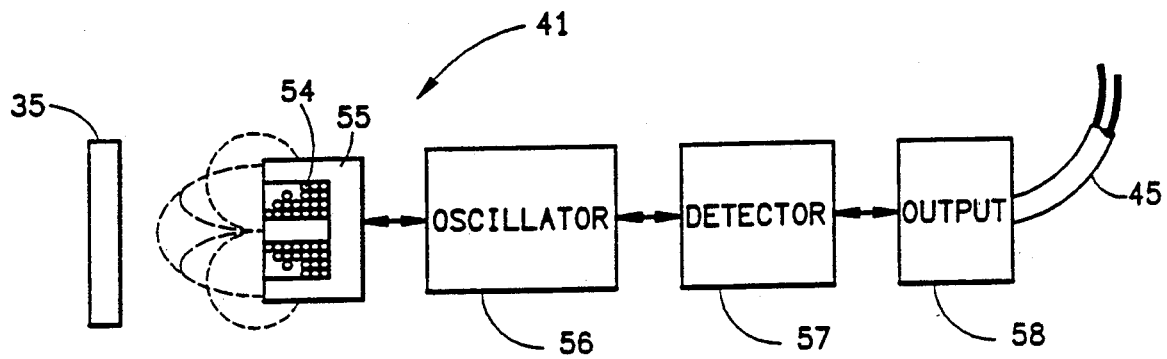
FIG. 5 is a functional representation of a proximity sensor incorporated in the differential pressure switch shown in FIG. 4.

Referring now to FIG. 5, proximity sensor 41, operates inductively and includes coil 54 and ferrite core 55 connected to oscillator 56. The oscillator is in turn connected to detector circuit 57 and to solid state output 58. The head of the sensor, comprised of the coil and ferrite core, are positioned adjacent target 35. Oscillator 56 generates a high frequency signal, which signal is provided as an input to coil 54 to generate an electro-magnetic field. Ferrite core 55 bundles and directs the electro-magnetic field toward aluminum target 35. When target 35 enters the high-frequency field, eddy currents are induced in the surface thereof. This results in a loss of energy in the oscillator circuit and, consequently, a smaller amplitude of oscillation. Detector circuit 57 recognizes a specific change in amplitude and generates a signal which will turn the solid-state output "ON" or "OFF." When aluminum target 35 leaves the sensing area, the oscillator regenerates, allowing the sensor to return to its normal state.

Aluminum has been chosen as the material of target 35 in the preferred embodiment. Other non-ferrous materials could be used. In some applications, steel or other ferrous material may be used with the proximity sensor but in the present invention aluminum provides the desired increased sensitivity while reducing the sensing range. It has been found that a ferrous target reduces sensitivity by a factor of about ten.

Figure 6A:
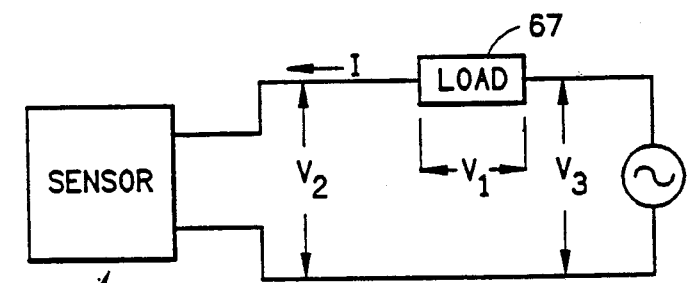
FIGS. 6A and 6B are schematic circuit diagrams showing the connection of the differential pressure switch of FIG. 4 in a two-wire AC or DC electrical configuration, respectively.
Figure 6B:
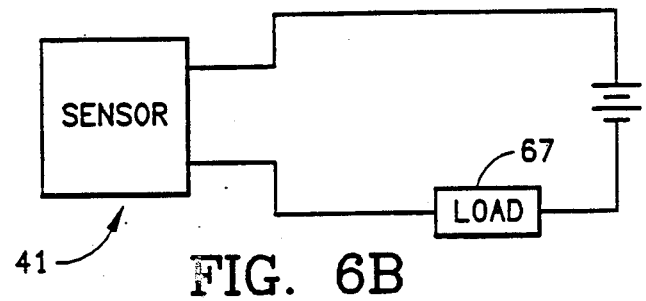

Referring now to FIG. 6, proximity sensor 41 may be incorporated in a two-wire or a three-wire AC or DC operation. In a two-wire AC configuration (FIG. 6A), the proximity sensor is wired in series with load 67, much like a limit switch. Load 67 is the solenoid valve of FIG. 7. The proximity sensor is powered by line voltage, thus eliminating the need for a separate power supply. A small leakage current I flows through the load when the sensor is OFF, such that the voltage drop $V_2$ across the sensor is approximately equal to the supply voltage $V_3$. When the sensor is ON, I equals the load current, generating a load voltage $V_1$, and the voltage drop across the sensor is less than 10 volts. In the two-wire DC configuration, proximity sensor 41 is wired to be either current sinking or current sourcing, depending on the location of the load, as shown in FIG. 6B. It can easily be appreciated that there is no significant difference in the physical configuration of the AC and the DC circuits.

Examples of proximity sensors which may be suitable for use as part of the differential pressure switch of the invention are manufactured by Turck Company and by Micro Switch, a division of Honeywell Corporation. A specific example is Turck Part Number Bi 5-S18-AZ3X, an "S Barrel" AC inductive sensor. An appropriate "S Barrel" DC inductive sensor is Turck Bi-5-S18-AD4X. Micro Switch sells its 900 Series proximity sensors for similar purposes. Proximity sensors from other manufacturers may also be suitable. The choice of a particular proximity sensor depends on the characteristics desired for the particular differential pressure switch application.

In operation, proximity sensor 41 senses aluminum sensor target 35 as it moves axially, relative to face 27 of the proximity sensor. Axial movement of the aluminum target occurs as a result of differential pressure between the first fluid cavity and the second fluid cavity. Thus, when the force due to the pressure in chamber 21 exceeds the force due to the compression spring and the pressure in chamber 16, flexible diaphragm 22 and the attached aluminum target translate axially toward face 27 of the proximity sensor. Conversely, when the force due to the compression spring and the pressure in chamber 16 exceeds the force due to the pressure in chamber 21, the flexible diaphragm and aluminum sensor target move axially away from the face of the proximity sensor.

The amount of pressure differential or force necessary to activate or deactivate the switch is very low. It can sense and react to as little as about one-half inch of water column (about 0.02 psi differential pressure) while the smallest low pressure switch known to be commercially available requires a minimum of about 0.3 psi differential pressure, an order of magnitude greater than that of this invention. Based on the strength of spring 37 and the size of diaphragm 22, the upper range of force could be 50–60 psi or even more.

Figure 1:
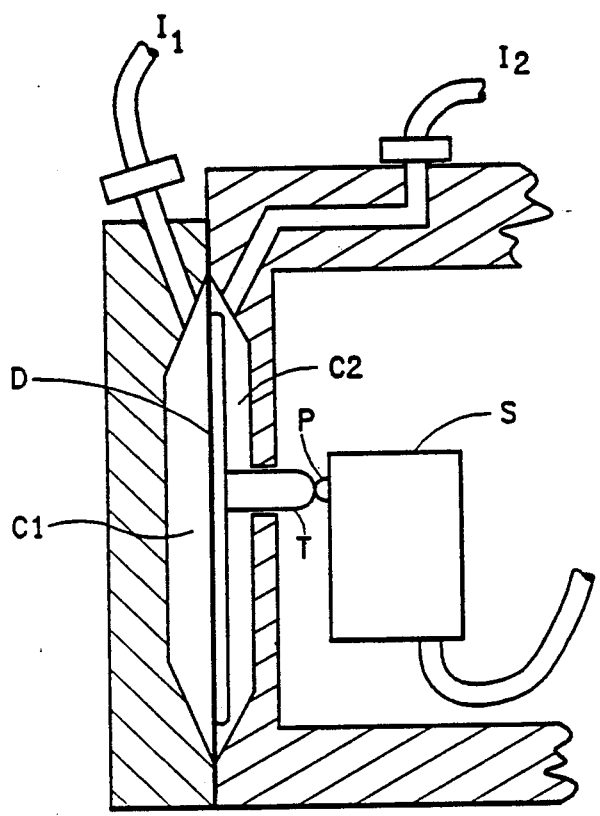
FIG. 1 is a partial cross-sectional side view of a prior art differential pressure switch.
Figure 3:
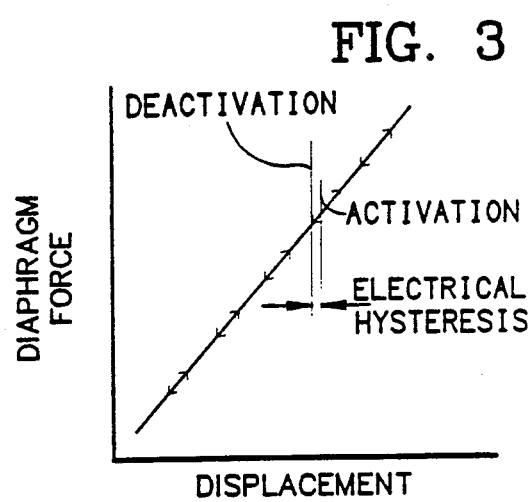
FIG. 3 is a graphical representation of the force vs. displacement hysteresis characteristics of a differential pressure switch constructed in accordance with the present invention.
Figure 2:
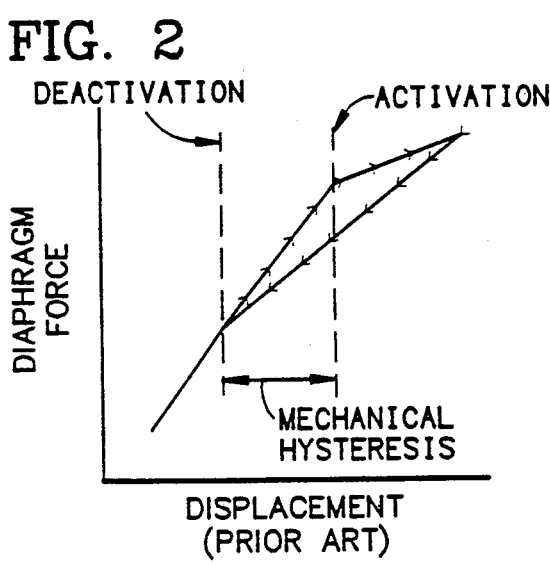
FIG. 2 is a graphical representation of the force vs. displacement hysteresis characteristics of the prior art differential pressure switch of FIG. 1.

The proximity sensor itself requires no mechanical force to perform the activation or deactivation of the electrical switch. This reduces the required mechanical force to that which is required to overcome the force of compression spring 37, and to some extent the flexural resistance of diaphragm 22, as the diaphragm resists movement of the aluminum sensor target. By proper adjustment of the sensor-target gap $\delta$ through rotation of the threaded sensor body in threaded chamber 18, the axial motion of the aluminum sensor target required to fully activate or deactivate the proximity sensor can be reduced to about 0.015 inch with an axial displacement hysteresis of about 0.002–0.009 inch (substantially less than the standard low differential pressure switch, which is typically 0.035 inch. It is interesting to note that the activation distance for a ferrous target is 0.2 inch, with a hysteresis of 0.1 inch). The hysteresis of switch 11 is due almost entirely to the electrical characteristics of the detector circuit (FIG. 5) of proximity sensor 41, while the standard switch has to contend with mechanical hysteresis. Thus, the force versus displacement hysteresis characteristics of switch 11 are negligible as shown in the graph of FIG. 3. Sensor-Target gap adjustment is accomplished by loosening bolts 44 to release O-ring seal 42, then the barrel of sensor 41 is rotated as desired. Calibration marks 49 may be provided for precise sensitivity adjustment. For example, one full turn of sensor 41 may change switch sensitivity from one inch to six inches of water column.

A combination of lower activation force and smaller displacement requirements allow the use of a smaller diaphragm. This in turn permits switch activation with smaller volumetric displacements. In a preferred embodiment, flexible diaphragm 22 is two inches in diameter and would have an area of not more than about 3.14 square inches. The diaphragm would not likely be smaller than one inch in diameter, about the size of end 27 of the proximity sensor. In addition, the linear displacement of the flexible diaphragm and target required to activate the proximity sensor would be in the range of about 0.010–0.016 inch. In this arrangement, the volumetric displacement required to activate switch 11 could be as low as about 0.028 cubic inch. It can be made as large as one would desire so there is no realistic upper limit. Also, in the preferred embodiment, the flexibility of the flexible diaphragm and the spring constant associated with the compression spring would be selected such that the pressure differential required to activate the proximity sensor is as low as 0.02 psi, and about 0.04 psi for the two inch diameter model discussed above.

These characteristics compare very favorably with what are believed to be the best differential pressure switches currently available in the market, from the standpoint of being explosion proof, impervious to petroleum products and having the capability of relatively low differential pressure sensing. Commercially available products have several possible pressure sensitivities, but require several different versions to accomplish the range. Examples of their diaphragm sizes are 4.52 and 9.35 square inches; their diaphragm linear displacement for activation is 0.02 to 0.035 inch, and their volumetric displacement is 0.09 and 0.187 cubic inch or more. All of these parameters show the advantages of the present invention. Other available differential pressure switches can perform some of the tasks required of the present switch but have some drawbacks. They may not be explosion proof or they may not be impervious to petroleum products.

In very low flow systems, that is, systems having a flow rate of between 0.01 and 0.1 gallons per hour, small volumetric displacement is a key requirement when sensing small differential pressures. In the preferred embodiment, the low volumetric displacement threshold of about 0.028 cubic inches is more than adequate to properly sense very low differential pressures under very low flow conditions, that is, the conditions that would occur as a result of the presence of a small leak in a pressurized fluid line system. Thus, switch 11 may be particularly adapted to precision leak detection in environmentally sensitive applications such as petroleum pressurized pipelines. In addition, the range of differential pressures which may be sensed remains flexible due to the axial adjustment capability of proximity sensor 41 within housing 13, as well as the many spring constants which may be selected for compression spring 37. Moreover, switch 11 may be operated in severe fluid environments without degradation in the operating characteristics or function of the switch.

Figure 7:
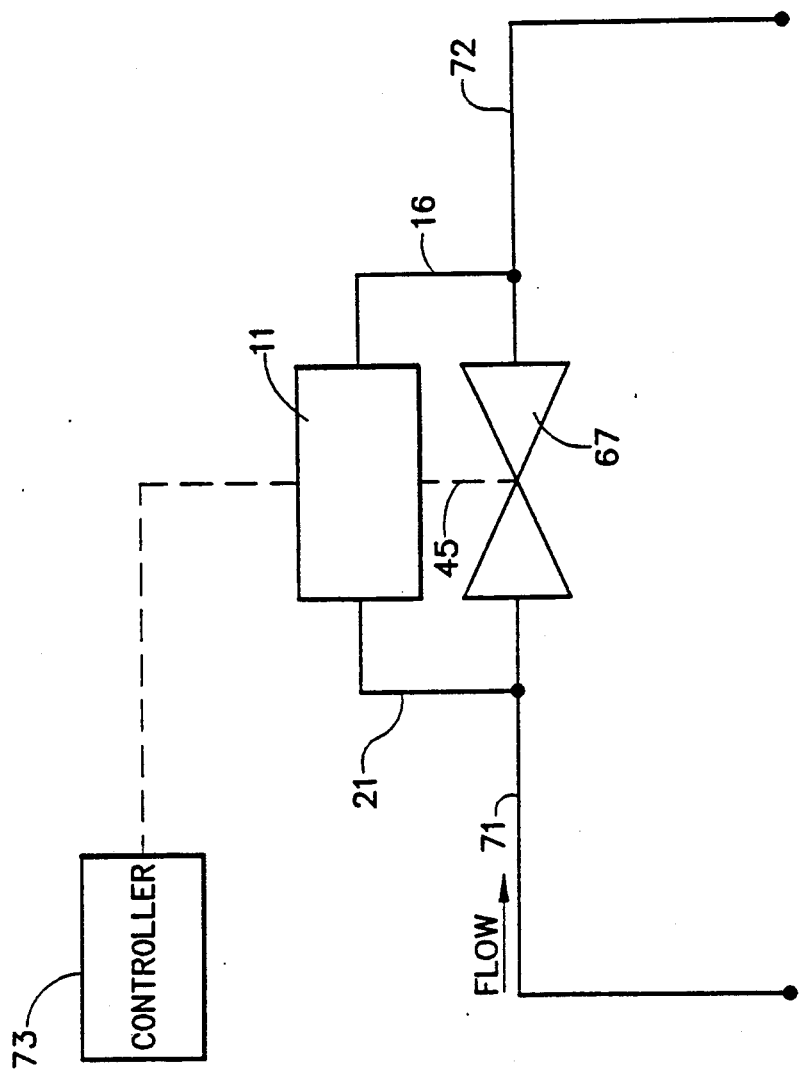
FIG. 7 is a block diagram of a precision flow sensor which implements the very low differential pressure switch constructed in accordance with the present invention.

An example of an application of this very low differential pressure switch would be for use in a precision flow sensor for very low flows as shown in FIG. 7. This type of flow sensor is well adapted for 0.01 gph or less flow rates, the rate desired for fuel pipeline leak detection. As shown in FIG. 7, a high pressure source 71 in fluid connection with cavity 21 of switch 11 and a low pressure source 72 in fluid connection with cavity 16 will cause the diaphragm and target to move closer to face 27 of the proximity sensor. Depending on the area of the diaphragm, size of the spring and threaded adjustment of the proximity sensor, a differential pressure can be preset. When the high pressure in cavity 21 is high enough to overcome the force of the low pressure in cavity 16 and the force of spring 37, the target will be moved into sensing range of the proximity sensor. The proximity sensor is connected to a power source and a load as shown in FIG. 6. When the normally open output of the proximity sensor closes, it conducts and supplies the power source to solenoid control valve 67 (load). The solenoid control valve opens allowing the spring force and differential pressure to relax the diaphragm and equalize the pressure on either side of the diaphragm, thus causing the target to move away from the face of the proximity sensor. When the target has moved out of sensing range of the proximity sensor, the proximity sensor opens and removes the power source from the solenoid control valve (load), thereby causing the control valve to close.

The flow can be measured in several ways by making use of the electrical signal from the proximity sensor. Controller 73 monitors the electrical output of the proximity sensor and can measure the amount of "ON" time of the sensor or the number of times "ON" over a given time interval to determine the flow rate.

Thus, an improved fluid line control system including a very low differential pressure switch has been disclosed. Although several embodiments are shown and described, it should be understood that modifications and adaptations thereof will occur to persons skilled in the art. The protection afforded the invention, therefore, should not be limited except in accordance with the spirit of the following claims and their equivalents.

What is claimed is:

1. A low pressure, low flow, very low differential pressure switch comprising:
   a first cavity for receiving a first fluid pressure from a first fluid source;
   a second cavity for receiving a second fluid pressure from a second fluid source;
   a flexible diaphragm dividing said first and second cavities and being adapted to move in response to a very low pressure differential existing between said first cavity and said second cavity;
   a sensor target located against and moving with said diaphragm within said second cavity;
   a non-contacting proximity sensor having a sensor head spaced by a predetermined distance under no differential pressure condition from said target, said sensor being responsive to the relative position of said target and said sensor head produce an output signal indicative of a pressure differential condition existing between said first and second cavities and;
   means for converting said output signal to ON/OFF switch signals.

2. The switch of claim 1, and further comprising spring means for biasing said target away from said sensor head and toward said diaphragm.

3. The switch of claim 2, wherein said switch is configured with selected pressure sensitivity and volumetric displacement thresholds dependent in part on the cross-sectional area of said diaphragm, the spring constant of said spring means and on the distance between said target and said sensor head.

4. The switch of claim 1, wherein the cross-sectional area of said diaphragm and the space between said target and said sensor head are selected to provide a differential pressure sensitivity ranging from at least as low as 0.02 psi.

5. The switch of claim 1, wherein the differential pressure sensitivity of said switch is about 0.04 psi.

6. The switch of claim 1, wherein the cross-sectional area of said diaphragm and the space between said target and said sensor head are selected to provide a switch actuating volumetric displacement threshold at least as low as about 0.028 cubic inch.

7. The switch of claim 1, wherein the cross-sectional area of said diaphragm is not more than about 3.1 square inches and the space between said target and said sensor head is selected to provide a differential pressure sensitivity of about 0.04 psi and a switch actuating volumetric displacement threshold of about 0.028 cubic inch.

8. The switch of claim 1, wherein the cross-sectional area of said diaphragm is about 0.785 square inches.

9. The switch of claim 1, wherein said switch has a force/displacement hysteresis dependent substantially solely on the electrical hysteresis of said proximity sensor.

10. The switch of claim 1, wherein the linear motion of said target necessary to activate and deactivate said sensor is about 0.015 inch with an axial displacement hysteresis ranging between 0.002 and 0.009 inch.

11. The switch of claim 1, and further including a biasing mechanism operatively connected to said sensor target to provide a biasing force away from said proximity sensor.

12. The switch of claim 9, and further including a biasing mechanism operatively connected to said sensor target to provide a biasing force away from said proximity sensor, said differential pressure sensitivity and volumetric displacement threshold being dependent in part on said biasing force, the cross-sectional area of said diaphragm and the space between said target and said sensor head, said biasing force, said cross-sectional area and said target and sensor head spacing being selected to provide a differential pressure sensitivity at least as low as 0.02 psi, a switch actuating volumetric displacement threshold of about 0.028 cubic inch, and a hysteresis displacement differential of not more than about 0.010 inch.

13. The switch of claim 1, wherein said sensor target is made from nonferrous metals.

14. The switch of claim 13, wherein said sensor target is made of aluminum.

15. The switch of claim 1, wherein said sensor is made from ferrous metals.

16. The switch of claim 1, wherein said proximity sensor is adjustably positionable with respect to said sensor target to change said predetermined distance.

17. The switch of claim 1, wherein said switch includes a housing and said proximity sensor is threadably mounted therein for adjustable positioning with respect to said target to change said predetermined distance.

18. A fluid system for measuring the leakage flow rate of fluid in a pressurized fluid line in which the flow rate is normally zero, said system comprising:
   a fluid source;
   a first fluid line extending from said fluid source to a fluid control valve;
   a second fluid line extending from said fluid control valve to a fluid dispenser;

a low pressure, low flow, very low differential pressure switch mounted across said fluid control valve so as to have one fluid inlet on a first side of said valve and second fluid inlet on a second side of said valve, said differential pressure switch including:
   a first fluid cavity in fluid pressure communication with said one fluid inlet on said first side of said control valve;
   a second fluid cavity in fluid pressure communication with said second fluid inlet on the second side of said control valve;
   a flexible diaphragm dividing said first and second fluid cavities and being adapted to move in response to pressure differential existing between said first cavity and said second cavity;
   a metallic target located against and moving with said diaphragm in said second fluid cavity; and
   a non-contacting proximity sensor spaced from said metallic target by a predetermined distance under no differential pressure condition, said proximity sensor including means for generating an inductive field and means generating a signal response to the relative position of said target and said sensor for producing an output responsive to pressure differential conditions between said first and second chambers, said output being ON/OFF switch signals; and
controller means for relating time to ON switching conditions of said switch and computing fluid flow rate related directly to said time related ON switching conditions.

19. The switch of claim 1, wherein said converting means comprises:
   a coil for generating an electro-magnetic field which is affected by said target;
   an oscillator connected to said detector coil for generation of said electro-magnetic field;
   a detector connected to said oscillator to detect changes in the oscillations resulting from changes in the distance between said target and said sensor head; and
   an output circuit responsive to the output of said detector for generating ON and OFF switching signals.

20. The system of claim 18, wherein said means for generating an inductive field and said means for generating a signal responsive to the relative position of said target and said sensor for producing an output comprise:
   a coil for generating an electro-magnetic field which is affected by said target;
   an oscillator connected to said detector coil for generation of said electro-magnetic field;
   a detector connected to said oscillator to detect changes in the oscillations resulting from changes in the distance between said target and said sensor head; and
   an output circuit responsive to the output of said detector for generating ON and OFF switching signals.

21. The system of claim 18, wherein the hysteresis of said pressure switch is very low.

22. The system of claim 21, wherein the axial displacement hysteresis of said switch ranges between 0.002 and 0.009 inch.

23. The system of claim 22, wherein the linear motion of said target necessary to activate and deactivate said sensor to produce ON/OFF signals is about 0.015 inch.

24. A low pressure, low flow, very low differential pressure switch comprising:
   a first cavity for receiving a first fluid pressure from a first fluid source;
   a second cavity for receiving a second fluid pressure from a second fluid source;
   a flexible diaphragm dividing said first and second cavities and being adapted to move in response to pressure differential existing between said first cavity and said second cavity;
   a sensor target located against and moving with said diaphragm within said second cavity;
   a non-contacting, low hysteresis proximity sensor having a sensor head spaced by a predetermined distance under no differential pressure condition from said target, said proximity sensor being adjustably positionable with respect to said sensor target to change said predetermined distance to thereby change the sensitivity of said switch, said sensor being responsive to the relative position of said target and said sensor head produce an output signal indicative of a pressure differential condition existing between said first and second cavities; and
   means for converting said output signal to ON/OFF switch signals.

25. The switch of claim 18, wherein said controller determines flow rate from the length of time the ON switching condition exists.

26. The switch of claim 18, wherein said controller determines flow rate from the number of times said switch turns ON over a given time interval.

* * * * *